United States Patent

[11] 3,630,694

| [72] | Inventors | Thomas J. Enright<br>Woodbury Heights, N.J.;<br>Sadun S. Tor, Phoenix, Md. |
|---|---|---|
| [21] | Appl. No. | 872,095 |
| [22] | Filed | Oct. 29, 1969 |
| [45] | Patented | Dec. 28, 1971 |
| [73] | Assignee | E. I. duPont de Nemours and Company<br>Wilmington, Del. |

[54] ALUMINUM/FERRITIC STAINLESS STEEL/STEEL COMPOSITES
10 Claims, 1 Drawing Fig.

[52] U.S. Cl. .................................................. 29/196.2,
29/421 E, 29/472.3, 29/504
[51] Int. Cl. ............................................... B32b15/18,
B32b 15/20, B23p 3/09
[50] Field of Search .......................................... 29/196.2,
472.3, 471.1, 421 E, 504

[56] References Cited
UNITED STATES PATENTS

| 3,326,647 | 6/1967 | Holtzman ..................... | 29/183.5 |
| 3,352,005 | 11/1967 | Avellone ...................... | 29/484 |
| 3,436,805 | 4/1969 | Friske et al. .................. | 29/482 |
| 3,495,319 | 2/1970 | Finnegan ...................... | 29/470.1 |

*Primary Examiner*—L. Dewayne Rutledge
*Assistant Examiner*—E. L. Weise
*Attorney*—Samuel S. Blight

ABSTRACT: Metal composites in which a layer of ferritic stainless steel having a yield strength of up to about 60,000 p.s.i. before bonding is metallurgically bonded to, and sandwiched between, a layer of aluminum and a layer of steel, have improved high-temperature stability, and afford electrical transition joints of better high-temperature capability than aluminum/steel transition joints heretofore known.

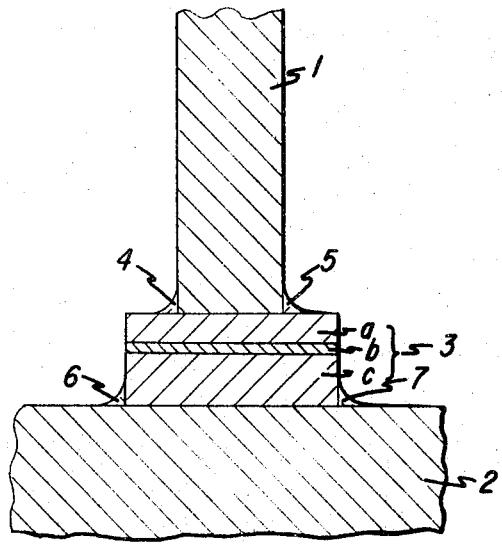
INVENTOR.
THOMAS J. ENRIGHT
SADUN S. TÖR
BY
Samuel S. Blight

ALUMINUM/FERRITIC STAINLESS STEEL/STEEL COMPOSITES

BACKGROUND OF THE INVENTION

This invention relates to metal composites that are useful, e.g., as improved electrical transition joints for joining aluminum components to steel components.

In electrolytic cells, such as those employed in fused salt electrolytic processes, e.g., for aluminum reduction, aluminum conductors are required to be joined to steel conductors. High-current efficiency requires a minimum of power loss across the connection. Mechanical joints are unsatisfactory because of the high resistance offered by the tenacious oxide skin on the aluminum surface and the consequent poor power transfer efficiency. On the other hand, direct fusion welding also is impractical as the aluminum/iron system forms brittle intermetallic phases. These phases offer high-electrical resistance and result in joints having low static and/or impact strength. The metallurgical bond achieved by a solid-state, substantially diffusionless bonding process, e.g., explosion bonding as described in U.S. Pat. Nos. 3,137,937, 3,264,731, and 3,397,444, avoids the limitations of mechanically and thermally joined connections. Explosion bonding, for example, allows the production of metal composites in which layers of dissimilar metals are bonded together metallurgically in direct metal-to-metal relationship with little or no alloy or intermetallic compound formation at the interface. Such an interface is ductile and has low electrical resistance. Therefore, a strong and electrically stable junction can be provided in an aluminum/steel conductor system, for example, by employing an explosion-bonded composite as a transition joint and applying conventional similar metal welding techniques to each side of the transition joint.

Aluminum/steel transition joints can be employed in a prebake aluminum reduction cell to produce permanent connections between an aluminum anode rod (joined to an aluminum positive bus bar) and a steel bracket which supports one or more prebaked carbon anodes, and between steel collector bars in the carbon pot lining (cathode) and aluminum straps leading to an aluminum negative bus bar. In Soderberg cells, aluminum/steel transition joints can be used between aluminum riser bars (attached to the anode bus bar) and steel pins which are embedded in, and support, the continuous baking carbon anode. The use of the transition joint in the cathode bus system in this cell is similar to that in prebake cells. To perform well in such cells, the transition joints should have a stable, low-electrical resistance, with uniform conductivity over the full interfacial area in an individual joint and uniform conductivity with respect to other joints used to make the same connection in a cell. Mechanical property requirements vary with the specific cell design and operational conditions and procedures, but usually the transition joints must be capable of resisting impact loadings, such as occur during anode recycling operations, and thermal cycling and, in the case of prebake cells, must support the weight of the steel bracket and carbon anode.

Explosion-bonded aluminum/steel transition joints, such as are described in copending, coassigned U.S. Pat. application Ser. No. 756,704, filed July 30, 1968, meet the service requirements described above. The interface in as-bonded aluminum/steel explosion-bonded composites is comprised of at least about 70 percent of the interfacial area, of directly bonded parent metal surfaces with any parent metal-to-brittle intermetallic phase surfaces present in isolated regions between the direct-bonding regions. The bond is substantially diffusionless, and the composites exhibit ordered plastic deformation localized at the interface. When welded in place in a prebake cell, for example, the aluminum/steel joints exhibit unexcelled strength and conductivity even after thousands of temperature changes and after sustained long term exposure to elevated temperatures, e.g., as high as 500° F. While stable properties at such temperatures are sufficiently satisfactory for electrical transition joints in aluminum reduction cells, stability at higher temperatures is desirable to add an extra measure of reliability in the joint should significant deviations from ordinary operating conditions occur inadvertently during cell operation. Thus aluminum/steel transition joints having improved stability of electrical and mechanical properties at elevated temperatures, i.e., at about 650° F. offer great interest to the aluminum industry, especially in aluminum reduction processes.

SUMMARY OF THE INVENTION

This invention provides metal composites comprising a layer of aluminum; a layer of steel; and an interlayer of ferritic stainless steel sandwiched between and metallurgically bonded to said layers of aluminum and steel over at least about 90° of each interface; the interlayer before bonding having a yield strength of up to about 60,000 p.s.i. and preferably being in the annealed condition. Preferably, the bond between the aluminum layer and the interlayer comprises, by area, at least about 70° direct metal-to-metal bonding. Such a bond preferably is produced by explosion bonding.

The yield strengths referred to herein are those normally supplied by metals manufacturers and are measured in the conventional manner (ASTM-E8-61T).

The term "aluminum" as used herein with reference to a metal layer in the composites of the invention denotes pure aluminum or an aluminum-base alloy containing at least 85 percent aluminum, by weight, and having a yield strength, measured before bonding, that does not exceed about 17,000 p.s.i.

Unless otherwise specifically indicated, the term "steel" is used herein to denote carbon steel and low-alloy steel, the terms "carbon steel" and "low-alloy steel" being used in the conventional sense. Thus, for example, both of these types of steel contain a maximum of about 2 percent carbon by weight, and the low-alloy steels contain less than about 5 percent metallic alloying elements, by weight.

"Ferritic stainless steel" is used herein in the conventional sense to denote stainless steels of the AISI 400 series that do not harden by quenching and tempering.

Under a given set of time-temperature conditions, the composites of the invention are less susceptible to interfacial brittle intermetallic formation at elevated temperatures with attendant decreases in electrical conductivity and mechanical strength than are metal composites in which aluminum is bonded directly to steel. Such composites therefore provide superior electrical transition joints and improved structural units and assemblies, e.g., electrolytic cells, in which aluminum is joined metallurgically to low-alloy or carbon steel.

BRIEF DESCRIPTION OF THE DRAWING

The accompanying drawing is a cross-sectional view of an aluminum component, e.g., an anode rod, joined metallurgically to a steel component, e.g., a carbon anode support, via a composite of this invention.

DETAILED DESCRIPTION OF THE INVENTION

In the composites of this invention a layer of aluminum is metallurgically bonded to a layer of ferritic stainless steel. When an aluminum-base alloy is employed, the type of alloying elements is not critical; however, aluminums containing less than 2.1 percent magnesium plus silicon, by weight, are preferred. Also, the aluminum layer can be in the fully annealed, partially annealed or hardened condition, the important consideration being its yield strength just before bonding. Exemplary aluminums are those having the designations 1100-F, 3003-0, 5005-0, 5457-0 and 6061-0 (Aluminum Association numbers and temper designations).

The interface between the aluminum layer and the ferritic stainless steel interlayer in the as-bonded composite is at least about 70 percent, and preferably at least about 90 percent, direct aluminum-to-steel interface. An interface of this character can be produced by any solid-state bonding technique that does not give a fusion or diffusion layer at the bond zone. Explosion bonding has proven to be a practical method of providing substantially diffusionless bonds containing at least about 70 percent, and if desired at least about 90 percent, direct bonding, and therefore is the preferred method of bonding the aluminum layer to the interlayer. An additional advantage of explosion bonding is that any nondirect bond is in the form of isolated regions of solidified melt (a substantially uniform mixture of aluminum and interlayer metals) that are substantially uniformly distributed between areas of direct aluminum-to-ferritic stainless steel bond.

In order to achieve the desired bond zone morphology, the ferritic stainless steel should have a yield strength below about 60,000 p.s.i., measured before bonding, i.e., when ready for bonding, and preferably will be in the annealed condition. Suitable ferritic stainless steels are, e.g., AISI 405, 409, 430, 442, and 446. Ferritic stainless steels whose AISI number is 430 or less are preferred because they are cheaper and they offer maximum electrical conductivity. The rate of diffusion across the interface between aluminum and ferritic stainless steels is lower than that across the interface between aluminum and low-alloy or carbon steels under the same time-temperature conditions, and therefore the composites of this invention have an improved high-temperature capability when used as transition joints.

The other layer bonded directly to the interlayer is low-alloy or carbon steel, e.g., one having the ASTM designation A–212—516–GR55 to 70) or A–204, or the SAE designation 1008 or 4620. Preferred steels are low-carbon steels containing less than about 0.3 percent carbon by weight because they offer maximum electrical conductivity. The bond zone between the ferritic stainless steel interlayer and the steel layer in the as-bonded composite can consist of a diffusion layer that metallurgically bonds the two layers; or a direct parent metal-to-parent metal interface, with or without associated solidified melt regions. Because the metals of the two layers constitute mutually soluble systems, no brittle phases form upon diffusion of atoms from one layer to another; consequently the layers may be bonded by diffusion techniques as well as by pressure-bonding techniques, e.g., explosion bonding.

Referring now to the drawing which shows part of a structural assembly, e.g., an electrolytic cell, aluminum member 1, e.g., a rod or bar, and steel member 2, e.g., a bar, rod, pin, or bracket, are joined together metallurgically by means of intervening electrical transition joint 3, e.g., a bar, consisting of three layers: aluminum layer $a$, ferritic stainless steel interlayer $b$ and steel layer $c$. The three layers of transition joint 3 are metallurgically bonded together at their respective interfaces as described above. Layer $a$ and member 1, and layer $c$ and member 2, are fusion welded, i.e., bonded metallurgically, along all lines where their surfaces intersect. In the drawing, two such lines between layer 2 and member 1 are denoted by 4 and 5, and two between layer $c$ and member 2 by 6 and 7. Both members of a welded pair preferably have about the same composition, e.g., 1100 Al–1100 Al and C–1008 steel-C–1008 steel, to assure maximum conductivity.

The thicknesses of the layers in the composites of this invention can vary according to the requirements of the intended application. The aluminum layer, which usually is thinner than the steel layer, generally is at least about ½-inch thick in transition joints to permit fusion welding of the joint to the appropriate member in a unit without the need for special techniques to avoid deleterious effects on the aluminum/ferritic stainless steel bond zone.

While the stainless steel interlayer affords a distinct benefit from the point of view of high-temperature capability, its use may require a small compromise in electrical conductivity. For this reason, the interlayer usually will be as thin as is practically possible. However, since separate interfaces, i.e., aluminum/ferritic stainless steel and ferritic stainless steel/steel, should be present in the composite to achieve the mentioned high-temperature capability, one factor to be considered in determining the minimum thickness of the interlayer is the size of the waves in the wavy interface produced when explosion-bonding techniques are employed. To keep the interfaces separated, the interlayer thickness needs to be greater than the sum obtained by adding the amplitude of the waves at one interface to the amplitude of the waves at the other interface. As a practical matter this means that the ferritic stainless steel layer should be at least about 20 mils thick, and preferable at least about 30 mils thick. When the stainless steel layer is to be propelled explosively and it is relatively large, e.g., greater than about 18 inches in either dimension, it usually will be at least about 60 mils thick for easier handling, although thinner layers can be applied explosively in small sizes without great difficulty. If the stainless steel interlayer is bonded to the layer of steel by other methods such as diffusion bonding or other pressure-bonding methods, the minimum thickness of the interlayer is determined not so much by handling problems encountered in the bonding process but rather by the wave amplitude produced in explosion-bonding the aluminum layer to the interlayer.

As has been stated above, the preferred method of bonding the aluminum layer to the interlayer is explosion-bonding, in particular by use of the conditions described in the aforementioned copending patent application, the disclosures of which are incorporated herein by reference. Briefly, the layers are arranged at a standoff from one another, preferably parallel to each other, and a layer of explosive propels the aluminum layer so that it collides progressively with the ferritic stainless steel at a collision velocity of about from 2500 to 3400 meters per second and at an impact angle of about from 14° to 25° and preferably not greater than about 20°. In general, to achieve such impact angles, one will employ an explosive loading weight (i.e., weight per unit area of explosive, exclusive of nonexplosive ingredients) of about from 0.2 to 3 times the weight per unit area of the aluminum layer and a standoff of about from 1 to 6 times the aluminum layer's thickness.

When both pairs of adjacent layers are bonded by explosion-bonding techniques, the composite can be produced by bonding the three layers simultaneously under the conditions defined above for bonding aluminum to ferritic stainless steel, e.g., by positioning the layers at the selected initial standoff from each other and initiating a layer of explosive on the outside surface of the aluminum layer. In this case, the interface between the aluminum and ferritic stainless steel layers generally will be straight (nonwavy), direct aluminum-to-ferritic stainless steel bond, and the interface between the ferritic stainless steel and steel layers generally will be wavy and comprise at least about 70 percent direct stainless-to-steel bond. Alternatively, two layers can be bonded in one step, and a third bonded to the two-layered product in a second step. For example, the stainless steel interlayer can be bonded first to the steel layer under conditions described in U.S. Pat. Nos. 3,137,937, and 3,397,444. For this step, a collision velocity range of about from 1800 to 3200 meters per second is preferred to prevent the formation of solidification defects associated with the formation of large amounts of melt at the bond zone. Thereafter, the aluminum layer can be bonded to the stainless steel side of the resulting composite under the conditions defined above for aluminum/steel bonding. Following this procedure, the interface between the aluminum and ferritic stainless steel layers usually will be wavy and comprise at least about 70 percent direct aluminum-to-ferritic stainless steel bond, the remaining bond being isolated regions of solidified melt that are substantially uniformly distributed between areas of such direct bonding.

Irrespective of the bonding method employed, the ferritic stainless steel interlayer preferably will be metallurgically bonded to each adjacent layer over at least about 90 percent of their interface.

When explosion-bonding, edge-extension pieces preferably are employed on all edges of the explosively driven layer (cladder) when such layer is greater than 3/16-inch thick. This ensures the maximum degree of bonding and proper bond morphology at the initiation end of the cladder, i.e., the end where the explosive is initiated. The edge-extension pieces will normally be of about the same density and thickness as the cladder. The extension piece at the initiation end will have a width about six to eight times that of the cladder and normally is attached to the cladder by continuous butt-welding. Extension pieces at the other three edges will have a width of about two to four times that of the cladder and usually are attached to the cladder by tack welding. All extension pieces shear off during bonding. Where edge-extension pieces are employed, the layer of explosive should be of the same length and width as the cladder plus its extension pieces.

The composites can be used as transition joints in any system requiring a strong joint between aluminum and steels, but are especially useful as electrical transition joints between aluminum and low-alloy or carbon steels. The mechanical properties of the composites are essentially determined by the weakest of the parent metals, i.e., aluminum. Failure in shear and tension does not occur at the interfaces but rather in the aluminum and at strengths higher than those of the parent aluminum before bonding. The composites are resistant to impact loading as evidenced by the fact that they cannot be separated at either interface by a chisel, or by hammer impact in the Izod impact test. The composites exhibit no decrease in electrical conductivity after exposure to 650° F, for 2000 hours, nor can they be separated at the interfaces by a chisel after such exposure. Both before and after such exposure, the resistance to current flow through the composites, measured in a direction perpendicular to the plane of the bonds, that is contributed by the bonds themselves totals less than about 1 micro-ohm, and usually does not exceed about 0.3 micro-ohm. This value is determined by subtracting the known resistances of the aluminum, ferritic stainless steel, and steel layers from the measured resistance of the bonded composite.

The following examples illustrate preferred embodiments of this invention.

In all examples, the metal plates or sheets to be bonded are positioned parallel to each other at a standoff, a layer of explosive is positioned on the outer surface of one of the plates or sheets, and the explosive is initiated at the center of one of its two shorter edges. The collision velocity given in each case is the measured detonation velocity of the explosive layer, and the impact angle is determined from plate motion studies with a framing camera.

The chisel employed to test bond integrity has a V-shaped cutting edge that defines an included angle of 65°. Shear strengths are obtained by ASTM-A264.

EXAMPLE 1 a. A 12-inch×18-inch sheet of 405 (ferritic) stainless steel 1/16-inch thick (lightly cold-rolled, yield strength 43,000 p.s.i.) is bonded to a 12-inch×18-inch C–1008 steel plate 1-inch thick by detonating a layer of explosive adjacent the stainless steel sheet. The explosive layer is 1-⅛-inches thick and is a uniform mixture of grained 80/20 amatol (80 percent ammonium nitrate/20 percent trinitrotoluene) and 55 percent sodium chloride (table salt) based on the total weight of the composition, the particle size of the ammonium nitrate in the mixture being such that more than 95 percent of the particles are held on a No. 65 Tyler mesh screen, more than 60 percent are held on a No. 28 mesh, and 0 percent are held on a No. 8 mesh. The explosive loading is 6.3 lb./sq. ft., and the standoff is 0.125 inch. The collision velocity is 2,120 meters per second, and the impact angle is 9.8°. The resulting composite is annealed at 1,250° F. for 1 hour.

b. One-half-inch thick extension pieces of extruded aluminum are attached to all four edges of a 12-inch×18-inch plate of ½-inch thick 1100 aluminum (yield strength about 15,000 p.s.i.). The extension piece at the initiation end is 4 inches wide and is continuously butt-welded to the aluminum plate. The other three extension pieces are 2 inches wide and are tack-welded to the aluminum plate. This plate is then bonded to the stainless steel side of the stainless steel/carbon steel composite made according to step (a). The explosive layer, which is positioned on the aluminum, is 2-½ inches thick and is a mixture of grained amatol and salt like that used in step (a) except that the salt content is 45 percent and the ammonium nitrate particle size is such that less than 50 percent of the particles go through a No. 100 Tyler mesh screen, less than 20 are held on a No. 35 mesh, and 0 percent are held on a No. 8 mesh. The explosive loading is 15 lb./sq. ft., and the standoff is 3 inches. The collision velocity is 2990 meters per second, and the impact angle is 21.6°.

The trilayered composite formed is bonded over more than 90 percent of each interface. Both interfaces are wavy, the wave amplitude of the aluminum/stainless steel interface being 17 mils and that of the stainless steel/carbon steel interface being 6 mils. More than 70 percent of each interface is direct parent metal-to-parent metal bond. The as-bonded composite cannot be separated at either wavy interface by a chisel, and has a shear strength of 12,800 p.s.i. and a tensile strength of 19,600 p.s.i. It exhibits a ductile-type failure in the aluminum layer in both shear and tension. Resistance to impact loading is measured quantitatively by the Izod impact test wherein an unnotched sample of square cross section (0.394-inch square) is clamped in a vise at the aluminum/stainless steel interface with the aluminum layer exposed and the side of the aluminum layer struck by a pendulum-type hammer. Failure occurs by shearing in the aluminum layer upon absorption of 62.0 ft.-lb. of energy (an unclad layer of 1100 aluminum undergoes similar failure in this test by absorption of 56 ft.-lb. of energy). There is no separation at the interfaces.

After exposure to 650° F. for 2000 hours, the composite still cannot be separated at either wavy interface by a chisel. The electrical resistance of samples of the as-clad composite measured through the thickness of the samples and including the bond zones in the current path is 68 micro-ohms (interfacial resistances total 0.3 micro-ohm). The resistance is the same for samples exposed to 650° F. for 2000 hours.

EXAMPLE 2 a. Example 1 is repeated but without the annealing step. Results are the same except that the shear and yield strengths are 12,350 and 19,500 p.s.i., respectively.

EXAMPLE 3 a. The procedure described in example 1, step (a) is repeated with the exception that the stainless steel sheet employed is 430 stainless steel (lightly cold-rolled, yield strength 45,000 p.s.i.), the C–1008 steel plate is 1-½ inches thick, and the sheet and plate are 36 inches wide by 72 inches long. The explosive loading is 6.9 lb./sq. ft. and the collision velocity is 2420 meters per second. Standoff and impact angle are the same.

b. A 36-inch×72-inch plate of 1,100 aluminum ½-inch thick is bonded to the stainless steel side of the stainless steel/carbon steel composite by following the procedure described in step (b) of example 1. The explosive loading is 13.5 lb./sq. ft., the collision velocity is 2,920 meters per second, and the impact angle is 21°.

The trilayered composite formed is bonded over more than 90 percent of each interface. Both interfaces are wavy, the wave amplitude of the aluminum/stainless steel interface being 41 mils and that of the stainless steel/carbon steel interface being 13 mils. The as-bonded composite cannot be separated at either wavy interface by a chisel and exhibits ductile failure in the aluminum layer when tested in shear and tension.

After exposure to 650° F. for 2,000 hours, the composite still cannot be separated at either wavy interface by a chisel, and the electrical properties of the bond zones are as in example 1.

We claim:

1. A metal composite comprising a layer of aluminum; a layer of steel; and an interlayer of ferritic stainless steel sandwiched between and metallurgically bonded to said layers of aluminum and steel over at least about 90 percent of each interface, the ferritic stainless steel having a yield strength of up to about 60,000 p.s.i. before bonding and the bond between the aluminum and ferritic stainless steel layers comprising by interfacial area at least about 70 percent direct aluminum-to-ferritic stainless steel bond.

2. A three-layered composite of claim 1 wherein the total electrical resistance provided by the aluminum/ferritic stainless steel and ferritic stainless steel/steel interfaces is less than about 1 micro-ohm after heating at 650° F. for 2,000 hours.

3. A composite of claim 2 which has shear and tensile strengths greater than those of the aluminum layer before bonding.

4. A composite of claim 2 wherein the auminum/ferritic stainless steel interface comprises by interfacial area at least about 90 percent direct aluminum-to-ferritic stainless steel bond.

5. A composite of claim 2 wherein the aluminum layer contains less than 2.1 percent magnesium plus silicon by weight.

6. A composite of claim 5 wherein the layer of steel is low-carbon steel containing a maximum of about 0.3 percent carbon by weight.

7. A method of producing aluminum/steel electrical transition joints having improved electrical stability after prolonged exposure to temperatures of about 650° F. which comprises metallurgically bonding a layer of said aluminum to a layer of said steel via an interlayer of ferritic stainless steel having a yield strength before bonding of up to about 60,000 p.s.i., the conditions under which the layer of aluminum is bonded to said interlayer being such that the bond therebetween comprises, by interfacial area, at least about 70 percent direct aluminum-to-ferritic stainless steel bond.

8. A method of claim 7 wherein said layer of steel is low-carbon steel containing a maximum of about 0.3 percent carbon by weight.

9. A method of claim 8 wherein the aluminum is bonded to the ferritic stainless steel by explosion bonding.

10. A method of claim 9 wherein the aluminum layer contains less than 2.1 percent magnesium plus silicon by weight, and the ferritic stainless steel is in the annealed condition before bonding.

* * * * *